US012574212B2

(12) United States Patent
Nakatani

(10) Patent No.: US 12,574,212 B2
(45) Date of Patent: Mar. 10, 2026

(54) INFORMATION PROCESSING SYSTEM, INFORMATION PROCESSING METHOD, AND NON-TRANSITORY STORAGE MEDIUM FOR EXCHANGING AND COMPARING AN ENCRYPTED KEY, ENCRYPTED DATA, AND A HASH VALUE OF THE ENCRYPTED DATA VIA A DISTRIBUTED LEDGER PLATFORM

(71) Applicant: TOYOTA JIDOSHA KABUSHIKI KAISHA, Toyota (JP)

(72) Inventor: Sho Nakatani, Chiyoda-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 18/594,146

(22) Filed: Mar. 4, 2024

(65) Prior Publication Data

US 2024/0380573 A1    Nov. 14, 2024

(30) Foreign Application Priority Data

May 12, 2023    (JP) ................................. 2023-079572

(51) Int. Cl.
  *H04L 9/08*        (2006.01)
  *H04L 9/32*        (2006.01)

(52) U.S. Cl.
  CPC .......... *H04L 9/0819* (2013.01); *H04L 9/3236* (2013.01)

(58) Field of Classification Search
  None
  See application file for complete search history.

(56) References Cited

U.S. PATENT DOCUMENTS

2018/0343114 A1* 11/2018 Ben-Ari ................. H04L 9/302
2021/0245969 A1   8/2021 Walter et al.

FOREIGN PATENT DOCUMENTS

JP        2021-127246 A    9/2021
JP        2021-177666 A    11/2021
WO   WO 2017/145003 A1    8/2017

* cited by examiner

*Primary Examiner* — William J. Goodchild
(74) *Attorney, Agent, or Firm* — Finnegan, Henderson, Farabow, Garrett, and Dunner, LLP

(57)        ABSTRACT

Provided is an information processing system that mediates a data transaction between a data provider (DP) and a data consumer (DC), the information processing system including a control unit that inseparably executes making an encryption key for encrypted data obtained by encrypting data exchanged between the data provider and the data consumer available to the data consumer, or causing the data consumer to actually obtain the encryption key, and recording transaction complete between the data provider and the data consumer.

16 Claims, 7 Drawing Sheets

Figure 4A:
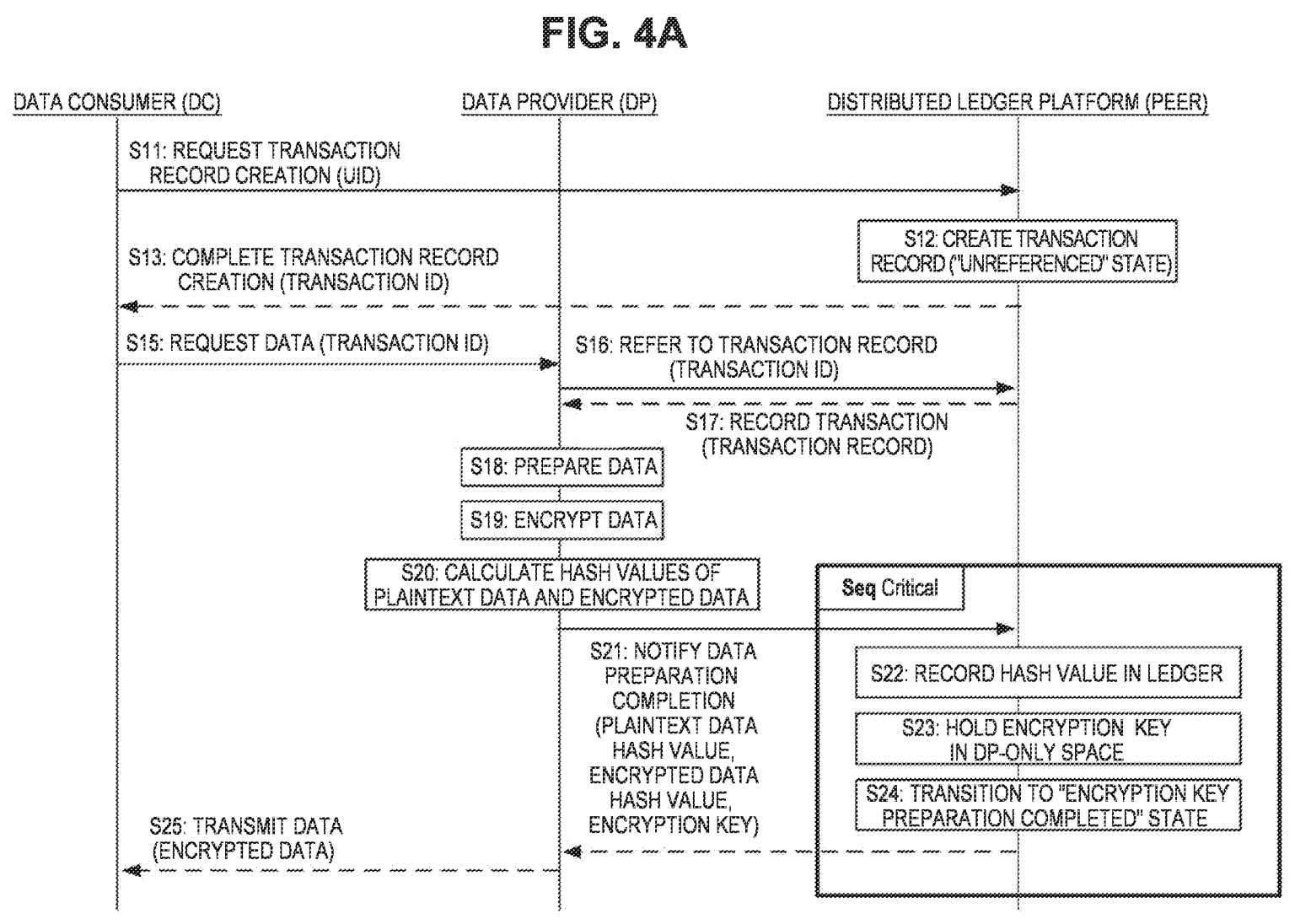

DATA CONSUMER (DC)

DATA PROVIDER (DP)

DISTRIBUTED LEDGER PLATFORM (PEER)

S11: REQUEST TRANSACTION RECORD CREATION (UID)

S12: CREATE TRANSACTION RECORD ("UNREFERENCED" STATE)

S13: COMPLETE TRANSACTION RECORD CREATION (TRANSACTION ID)

S15: REQUEST DATA (TRANSACTION ID)

S16: REFER TO TRANSACTION RECORD (TRANSACTION ID)

S17: RECORD TRANSACTION (TRANSACTION RECORD)

S18: PREPARE DATA

S19: ENCRYPT DATA

S20: CALCULATE HASH VALUES OF PLAINTEXT DATA AND ENCRYPTED DATA

S21: NOTIFY DATA PREPARATION COMPLETION (PLAINTEXT DATA HASH VALUE, ENCRYPTED DATA HASH VALUE, ENCRYPTION KEY)

Seq Critical

S22: RECORD HASH VALUE IN LEDGER

S23: HOLD ENCRYPTION KEY IN DP-ONLY SPACE

S24: TRANSITION TO "ENCRYPTION KEY PREPARATION COMPLETED" STATE

S25: TRANSMIT DATA (ENCRYPTED DATA)

FIG. 4B

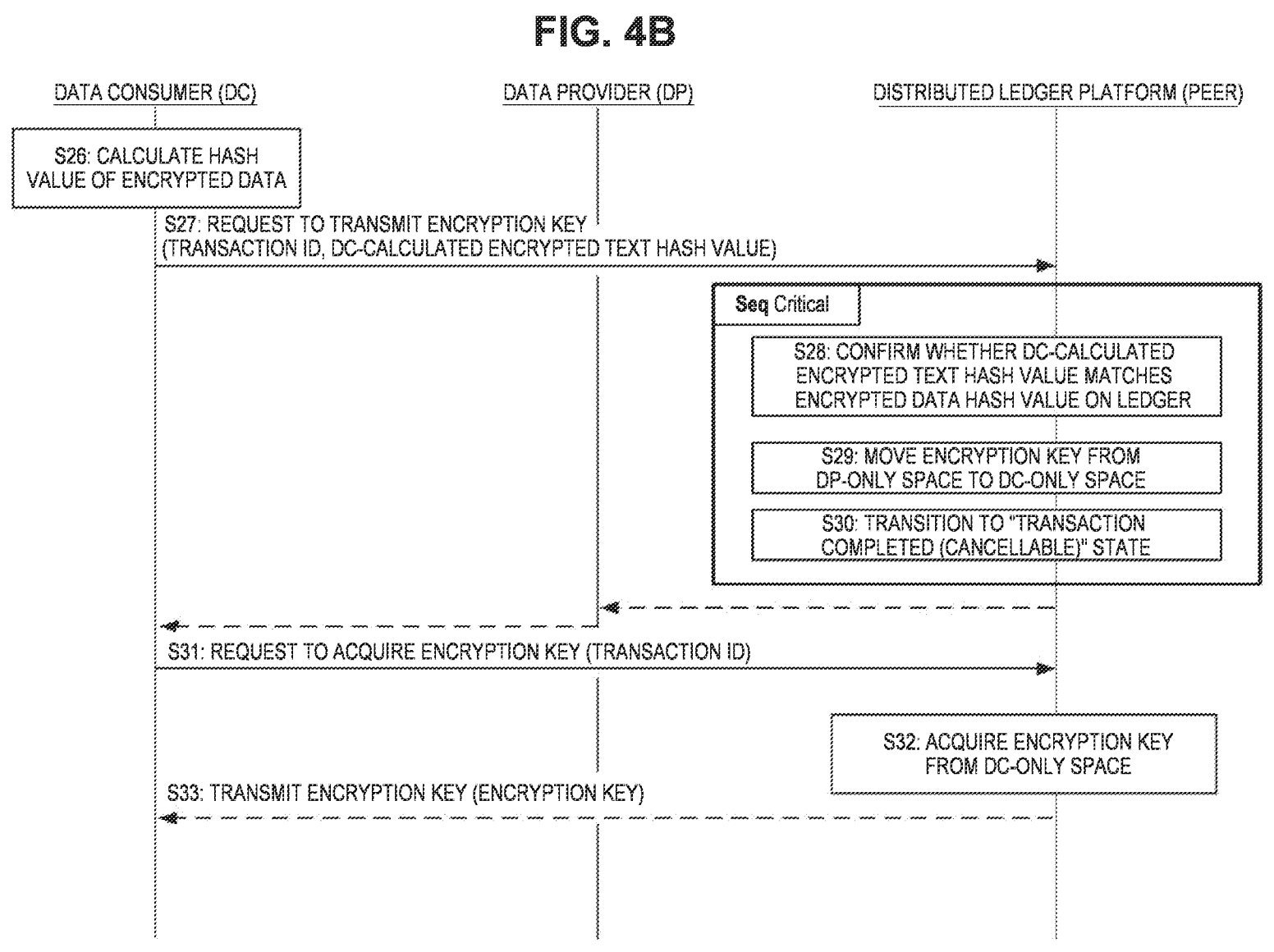

DATA CONSUMER (DC)

DATA PROVIDER (DP)

DISTRIBUTED LEDGER PLATFORM (PEER)

S26: CALCULATE HASH VALUE OF ENCRYPTED DATA

S27: REQUEST TO TRANSMIT ENCRYPTION KEY (TRANSACTION ID, DC-CALCULATED ENCRYPTED TEXT HASH VALUE)

Seq Critical

S28: CONFIRM WHETHER DC-CALCULATED ENCRYPTED TEXT HASH VALUE MATCHES ENCRYPTED DATA HASH VALUE ON LEDGER

S29: MOVE ENCRYPTION KEY FROM DP-ONLY SPACE TO DC-ONLY SPACE

S30: TRANSITION TO "TRANSACTION COMPLETED (CANCELLABLE)" STATE

S31: REQUEST TO ACQUIRE ENCRYPTION KEY (TRANSACTION ID)

S32: ACQUIRE ENCRYPTION KEY FROM DC-ONLY SPACE

S33: TRANSMIT ENCRYPTION KEY (ENCRYPTION KEY)

FIG. 4C

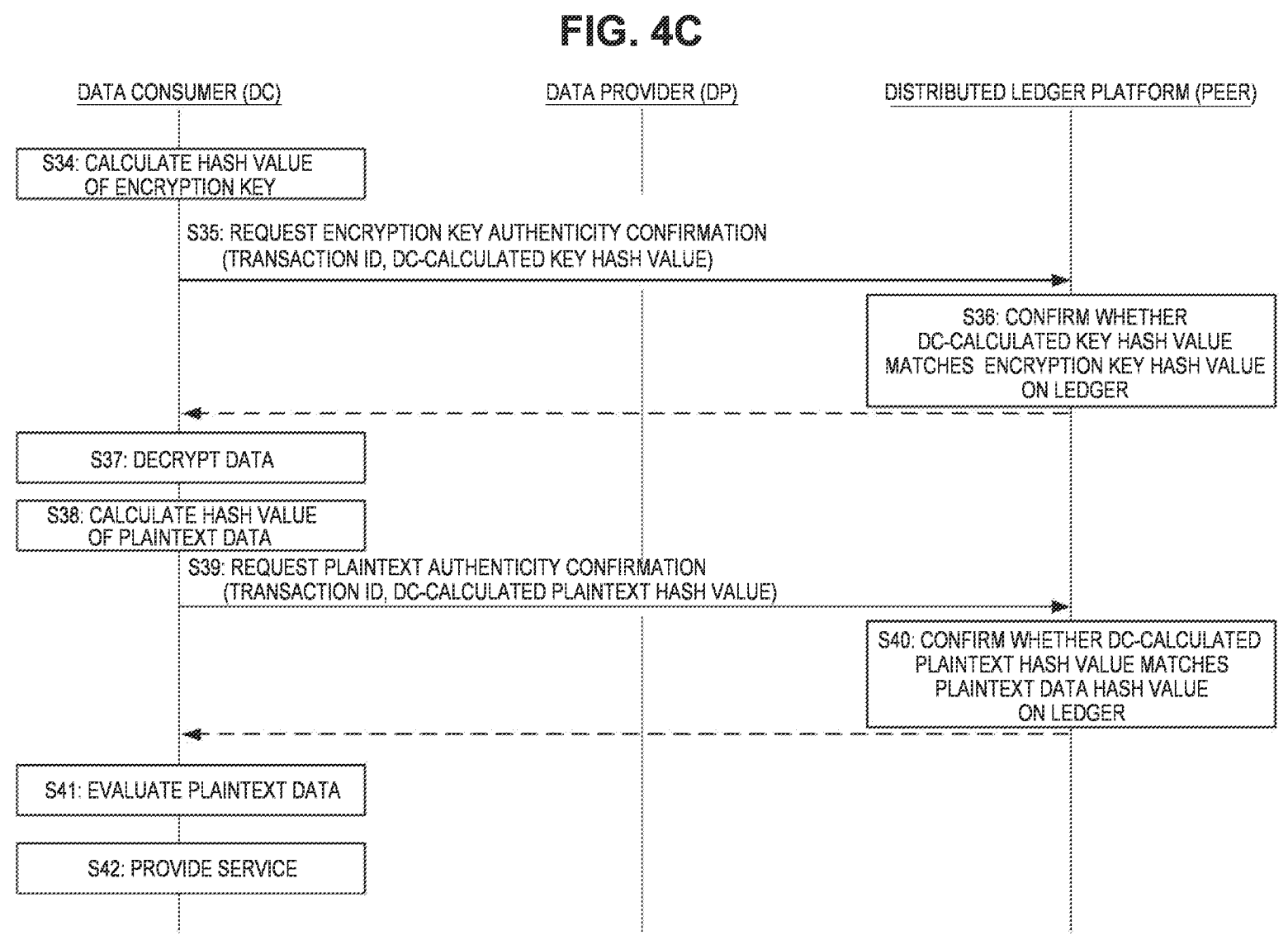

DISTRIBUTED LEDGER PLATFORM (PEER)

DATA PROVIDER (DP)

DATA CONSUMER (DC)

S34: CALCULATE HASH VALUE OF ENCRYPTION KEY

S35: REQUEST ENCRYPTION KEY AUTHENTICITY CONFIRMATION (TRANSACTION ID, DC-CALCULATED KEY HASH VALUE)

S36: CONFIRM WHETHER DC-CALCULATED KEY HASH VALUE MATCHES ENCRYPTION KEY HASH VALUE ON LEDGER

S37: DECRYPT DATA

S38: CALCULATE HASH VALUE OF PLAINTEXT DATA

S39: REQUEST PLAINTEXT AUTHENTICITY CONFIRMATION (TRANSACTION ID, DC-CALCULATED PLAINTEXT HASH VALUE)

S40: CONFIRM WHETHER DC-CALCULATED PLAINTEXT HASH VALUE MATCHES PLAINTEXT DATA HASH VALUE ON LEDGER

S41: EVALUATE PLAINTEXT DATA

S42: PROVIDE SERVICE

1

INFORMATION PROCESSING SYSTEM, INFORMATION PROCESSING METHOD, AND NON-TRANSITORY STORAGE MEDIUM FOR EXCHANGING AND COMPARING AN ENCRYPTED KEY, ENCRYPTED DATA, AND A HASH VALUE OF THE ENCRYPTED DATA VIA A DISTRIBUTED LEDGER PLATFORM

CROSS-REFERENCE TO RELATED APPLICATION

This application claims priority to Japanese Patent Application No. 2023-079572 filed on May 12, 2023, incorporated herein by reference in its entirety.

BACKGROUND

1. Technical Field

The present disclosure relates to an information processing system, an information processing method, and a non-transitory storage medium.

2. Description of Related Art

In data transactions, it is important not only to exchange the data itself, but also to keep transaction records for incentive settlements and evidence.

Japanese Unexamined Patent Application Publication No. 2021-177666 discloses an entity exchange method between users, and discloses generating an invitation (Tx) including an output (UTXO) associated with a hash of an encrypted and electronically transferable digital asset and a script. Here, the script includes an indication of the entity to be exchanged, the conditions for the exchange, and the public key associated with the user.

SUMMARY

The present disclosure provides a technology that can record transaction records in data exchange between a data provider and a data consumer, inseparably from the data exchange and with less effort.

A first aspect of the disclosure relates to an information processing system that mediates a data transaction between a data provider and a data consumer. In the information processing system, a control unit inseparably executes making an encryption key for encrypted data obtained by encrypting data exchanged between the data provider and the data consumer available to the data consumer, or causing the data consumer to actually obtain the encryption key, and recording a transaction record between the data provider and the data consumer as transaction complete.

In the first aspect, the control unit may provide the encryption key from the data provider to the data consumer via a distributed ledger platform.

In the first aspect, the control unit may be configured to record the transaction record on a distributed ledger platform.

In the first aspect, the control unit may be configured to use a smart contract function of a distributed ledger platform to inseparably execute making the encryption key available to the data consumer, or causing the data consumer to actually obtain the encryption key, and recording the transaction record as transaction complete.

In the first aspect, the control unit may be configured to use the smart contract function to inseparably record the encryption key in a data space of the distributed ledger platform that is able to be read and accessed only by the data consumer, and record the transaction complete in response to receiving the encryption key from the data provider.

In the first aspect, the control unit may be configured to record the encryption key in a data space of the distributed ledger platform that is able to be read and accessed only by the data consumer, and inseparably transmit the encryption key to the data consumer and record the transaction complete using the smart contract function in response to receiving a request for acquiring the encryption key from the data consumer.

In the first aspect, the control unit may be configured to acquire a hash value of the encrypted data from the data provider, and provide the encryption key to the data consumer when a hash value of the encrypted data calculated by the data consumer and the hash value acquired from the data provider match.

In the first aspect, the control unit may be configured to acquire a hash value of plaintext data corresponding to the encrypted data from the data provider, and update a state of the data transaction to transaction cancelled when a hash value, calculated from plaintext data obtained by the data consumer through decrypting the encrypted data using the encryption key, does not match the hash value of the plaintext data acquired from the data provider.

In the first aspect, for a predetermined period after the data consumer becomes able to acquire the encryption key or after the data consumer actually acquires the encryption key, the control unit may be configured to receive a transaction cancellation request from the data consumer and update a state of the data transaction to transaction cancelled, and then the control unit may be configured not to update the state of the data transaction after the predetermined period has elapsed.

In the first aspect, the control unit may be configured to place the encryption key in a data space that is not able to be read and accessed by anyone other than the data consumer of the distributed ledger platform.

In the first aspect, the control unit may be configured to encrypt the encryption key using a common key shared by the data provider and the data consumer, and to record the encryption key in the distributed ledger platform.

In the first aspect, the control unit may be configured to encrypt the encryption key using a public key of the data consumer and record the encryption key in the distributed ledger platform.

A second aspect of the disclosure relates to an information processing method that is performed by an information processing system that mediates a data transaction between a data provider and a data consumer. The information processing method includes inseparably executing making an encryption key for encrypted data obtained by encrypting data exchanged between the data provider and the data consumer available to the data consumer, or causing the data consumer to actually obtain the encryption key, and recording a transaction record between the data provider and the data consumer as transaction complete.

A third aspect of the disclosure relates to a non-transitory storage medium storing instructions that are executable by one or more processors and that cause the one or more processors to perform the second aspect.

A fourth aspect of the disclosure relates to a non-transitory storage medium storing a first instruction that is executable by one or more processors and that causes the one or more processors to perform functions. The functions include controlling a distributed ledger platform so as to inseparably execute making an encryption key for encrypted data obtained by encrypting data exchanged between a data provider and a data consumer available to the data consumer via the distributed ledger platform, or causing the data consumer to actually obtain the encryption key from the distributed ledger platform, and recording a transaction record between the data provider and the data consumer as transaction complete in the distributed ledger platform.

In the fourth aspect, making the encryption key available to the data consumer via the distributed ledger platform may mean recording the encryption key in a data space of the distributed ledger platform that is able to be read and accessed by the data consumer.

In the fourth aspect, causing the data consumer to actually obtain the encryption key from the distributed ledger platform may mean that the distributed ledger platform transmits the encryption key to the data consumer in response to a request to acquire the encryption key from the data consumer.

The non-transitory storage medium according to the fourth aspect may store a second instruction that performs functions. The functions include receiving a transaction cancellation request from data consumer and updating a state of data transaction between the data provider and the data consumer to a transaction cancelled state for a predetermined period after the data consumer becomes able to acquire the encryption key or after the data consumer actually acquires the encryption key, and not updating the transaction record after the predetermined period has elapsed.

In the fourth aspect, the function may cause the distributed ledger platform to perform recording the encryption key in a data space of the distributed ledger platform that is able to be read and accessed only by the data provider in response to receiving the encryption key from the data provider, and recording the encryption key in a data space of the distributed ledger platform that is able to be read and accessed only by the data consumer in response to receiving an encryption key acquisition request from the data consumer.

In the fourth aspect, the function may further include causing the distributed ledger platform to perform receiving from the data provider a hash value of the encrypted data calculated by the data provider, and receiving from the data consumer a hash value of the encrypted data calculated by the data consumer, and recording the encryption key in the data space of the distributed ledger platform that is able to be accessed only by the data consumer may be executed when the hash value of the encrypted data calculated by the data provider matches the hash value of the encrypted data calculated by the data consumer after receiving an encryption key acquisition request from the data consumer.

With each aspect of the present disclosure, transaction records in data exchange between a data provider and a data consumer can be recorded reliably and with less effort.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating a schematic configuration of a data exchange system according to one embodiment;

FIG. 3 is a diagram illustrating an overview of a data exchange process in the embodiment;

FIG. 4A is a sequence diagram illustrating the data exchange process in the embodiment;

FIG. 4B is a sequence diagram illustrating the data exchange process in the embodiment;

FIG. 4C is a sequence diagram illustrating the data exchange process in the embodiment.

DETAILED DESCRIPTION OF EMBODIMENTS

Overview

Figure 2:
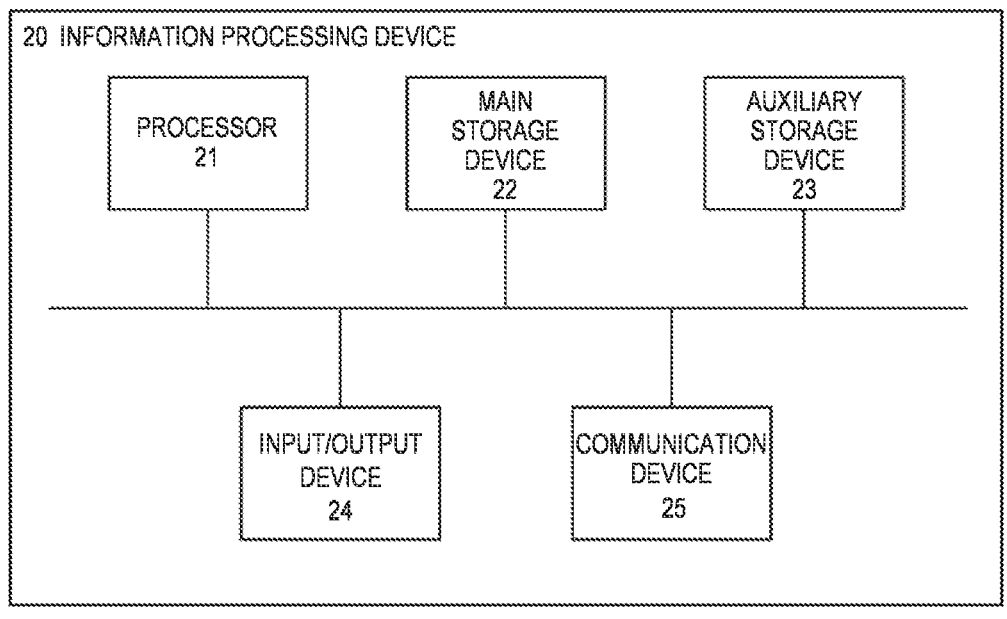
FIG. 2 is a diagram illustrating a configuration of an information processing device in the embodiment.

First, a case is considered where the exchange of data (data transaction) is accompanied by incentives between different entities. In the present disclosure, an entity that transmits data is referred to as a data provider, and an entity that receives data and uses it to provide a service is referred to as a data consumer. The data provider and data consumer are also respectively referred to as the DP and the DC. Furthermore, these terms represent not only the entity itself, but also the information processing device or information 30 processing system managed by the entity.

In data transactions, it is important not only to exchange the data itself, but also to keep transaction records for incentive settlement and evidence.

It can be said that the interests of the DP and the DC are in conflict. The DP aims to receive incentives while minimizing costs, and the DC aims to obtain data without incurring incentive costs. Therefore, it is necessary to prevent discrepancies between actual data exchange and transaction records, and to prevent the DPs or the DCs from accruing unfair profits. On the other hand, it is desirable to avoid expanding a significant amount of effort and cost in data mediation to prevent unfair profits.

Therefore, an embodiment of the present disclosure provides a technology that allows a transaction record in data exchange between the DP and the DC to be reliably recorded such that there is no discrepancy with the actual data transaction, and the transaction can be recorded with less effort.

One embodiment of the present disclosure is an information processing system that mediates data transactions between a data provider (the DP) and a data consumer (the DC). The DP is a device that provides data to the DC, and the DC is a device that acquires data from the DP and uses the data.

In one embodiment of the present disclosure, the information processing system includes a control unit that inseparably executes making an encryption key of encrypted data obtained by encrypting data exchanged between the DP and the DC available to the DC, or making the DC actually obtain this encryption key, and recording the transaction record between the DC and the DP as transaction complete.

In the present disclosure, "making data available to the DC" and "making the DC actually acquire the data" are also expressed as "providing data to the DC". For example, in the present disclosure, a process by which the information processing system provides the encryption key to the DC includes at least one of a process of making the encryption key available to the DC, or a process of actually transmitting the encryption key to the DC. Therefore, one embodiment of the present disclosure can also be expressed as one that inseparably performs providing the encryption key to the DC and recording the transaction record between the DC and the DP as transaction complete.

"Executing multiple processes inseparably" means that when any one of multiple processes is executed, the remaining processes are also executed; in other words, it is controlled that either all of the multiple processes are executed, or none of the multiple processes are executed. Processes and operations that are executed inseparably are also referred to as "transaction processes", "inseparable operations", "atomic operations", and the like.

In one embodiment of the present disclosure, the exchange of encryption keys and recording of transaction records between the DP and the DC may be performed using distributed ledger technology (block chain technology). When employing distributed ledger technology, the information processing system in the present disclosure is one or more information processing devices that form at least a part of a distributed ledger platform. A peer node is an example of an information processing device that forms part of a distributed ledger platform. In this embodiment, the enabling or actual acquisition of the encryption key and the recording of transaction complete may be performed inseparably using the smart contract function of the distributed ledger technology. A "smart contract" is a function that automatically executes predetermined processes such as reading and writing records on a distributed ledger. In this embodiment, the control unit records transaction complete in the transaction record on the condition that the encryption key is provided to the DC. By using the smart contract function, it is possible to ensure that these two processes are inseparable.

When making the encryption keys available to the DC and recording the complete of the transaction between the DC and the DP can be executed inseparably, the complete of the transaction can also be recorded with the smart contract function when writing the encryption key (in an area readable and accessible by the DC). Using a distributed ledger technology that requires data to be written via a smart contract is an example of a method that realizes the inseparable process.

As an example, in response to receiving the encryption key from the DP, the control unit inseparably records the encryption key in the distributed ledger and the transaction complete using the smart contract function. A distributed ledger is a data space that can be read and accessed by any participating node, and is an example of a data space that can be read and accessed by a DC. Another example of a data space that can be read and accessed by a DC is a data space that can be read and accessed by a DC only. A specific example of such a data space is a private data collection in the Hyperledger Fabric platform. By using a smart contract function that records the transaction complete when recording the encryption key in the data space of the distributed ledger platform that can be read and accessed by the DC, making the encryption keys available to the DC and recording the transaction complete between the DC and the DP can be executed inseparably.

In order to inseparably execute both making the DC actually obtain the encryption key and recording the transaction complete, it is desirable for the DC to use the smart contract function when acquiring the encryption key. In distributed ledger technology, one method that requires going through a smart contract when acquiring data is to store the data in a data space (private space, such as a private data collection of Hyperledger Fabric) that can only be accessed by authorized persons. Therefore, by placing the encryption key in the private space of the DC, when the DC acquires the encryption key, the smart contract function can inseparably execute the acquisition of the encryption key and record the transaction complete.

As an example, in response to receiving the encryption key from the DP, the control unit records the encryption key in a data space of the distributed ledger platform that can be read and accessed only by the DC, and then in response to receiving the encryption key acquisition request from the DC, the control unit uses the smart contract function to inseparably transmit the encryption key to the DC and record the transaction complete. In distributed ledger technology, a smart contract function can be used as essential when reading data from a data space (private space) that can only be accessed by a DC. Therefore, by using a smart contract function that records transaction complete when receiving a request to acquire an encryption key from a DC and transmitting the encryption key to the DC, making the encryption keys available to the DC and recording the transaction complete between the DC and the DP can be performed inseparably.

As described above, providing the encryption key to the DC and marking the transaction record as transaction complete are executed inseparably, thereby preventing a discrepancy between the data transaction (data exchange) and the transaction record. Therefore, it is possible to prevent the DC from denying the transaction complete and refusing incentive payments after the DC acquires data, and prevent the DP from asserting the transaction complete and receiving incentive payments without providing data. Another advantage of the present disclosure is that less processing is required in the mediation system, and mediation of data exchange can be performed at low cost.

In this embodiment, a channel for exchange of data and a separate channel for processes related to data exchange, such as encryption keys and transaction records, may be established. Channel separation may be logical separation or physical separation. Channels are also called planes (control plane and data plane). "Channel" here means a logical or physical communication path, and is different from the concept of channel used in a distributed ledger platform.

As an example of channel separation, a process related to encryption key exchange and transaction records may be performed via a distributed ledger platform, and the encrypted data itself may be provided from the DP to the DC without going through the distributed ledger platform. This is because distributed ledgers are not suitable for recording large amounts of data. Exchange using a distributed ledger targets encryption keys with small data sizes, and the data itself is exchanged using a separate route, making it possible to execute efficient processing. Furthermore, encrypting and interchanging the data has the effect that even when the encrypted data itself is leaked to a third party, the content of the plaintext cannot be known, and thus the secret of the plaintext is protected.

This separation of channels is expected to simplify implementation, and even when distributed ledger technology is used, efficient processing can be expected. In other embodiments of the present disclosure, encrypted data may also be provided from the DP to the DC using a distributed ledger.

In one embodiment of the present disclosure, an information processing system that mediates data transactions between a DP and a DC includes peer nodes that configure a distributed ledger network, and the peer nodes have a function of executing the smart contract.

In one embodiment of the present disclosure, for a predetermined period after providing the encryption key to the DC, the transaction record may be allowed to be updated from the transaction completed state to the transaction canceled state, and after the predetermined period has elapsed, the transaction record may not be updated from the transaction completed state. Even when the transaction is recorded as completed within the predetermined period, it is possible to cancel the transaction, thus the status within and after the predetermined period can be respectively differentiated into "transaction provisionally completed" and "transaction completed" in a narrow sense, or "transaction completed (cancellable)" and "transaction completed (finalized)". Transaction suspension, occurring within a predetermined period, may be performed in response to the identification of data transaction inconsistency by the distributed ledger platform, or in response to receiving a transaction cancellation request from the DC. When cancelling a transaction in response to a request from a DC, it is desirable to receive the reason for discontinuing the transaction from the DC, thus the control unit or other functional unit of the information processing system may evaluate the reliability of the DC and DP by verifying whether the reason for the cancellation is appropriate after the transaction is cancelled, or it may cancel the transaction by evaluating whether the reason for cancellation is appropriate.

When the transaction is completed with the provision of the encryption key, there may be problems that the encrypted data cannot be decrypted using the provided encryption key, or it can be decrypted but the decrypted data has no value (for example, the decrypted data is different from what the DC requested). In such a case, it is desirable to be able to cancel the transaction, thus it is advantageous for appropriate data exchange to be able to cancel the transaction within a predetermined period from the provision of the encryption key through the above process.

In one embodiment of the present disclosure, the control unit of the information processing system may acquire the hash value of the encrypted data from the DP, and then provide the encryption key to the DC when the hash value of the encrypted data calculated by the DC itself matches the hash value calculated by the DP. Here, "providing the encryption key to the DC" may be performed by the information processing system directly transmitting the encryption key to the DC, by the information processing system requesting another device to transmit the encryption key to the DC, by the information processing system recording the encryption key in a storage (for example, a distributed ledger) that can be read and accessed by the DC, or the like.

Further, the information processing system may confirm whether the DP-provided hash value and the DC-calculated hash value match, or the DC may confirm and then notify the information processing system. When the DC transmits a notification to the information processing system, it can take the form of, for example, an encryption key acquisition request transmitted to the information processing system on the premise that the DC has confirmed the match. When the information processing system is to confirm, for example, the information processing system may receive the DC-calculated hash value from the DC in the form of an encryption key authenticity confirmation request or the like, and compare the DC-calculated hash value with the DP-provided hash value.

Furthermore, when the DP-provided hash value and the DC-calculated hash value do not match, the information processing system preferably updates the transaction record to a transaction canceled state or other error state. Specifically, the information processing system may update the transaction record to a transaction canceled state in one of the following cases: when the information processing system receives a report of a mismatch from the DC within a predetermined period, when the information processing system does not receive a report of a match from the DC within a predetermined period, or when the information processing system receives the DC-calculated hash value from the DC within a predetermined period and confirms that the DC-calculated hash value does not match the DP-provided hash value.

In this way, when the DP-provided hash value of encrypted data and the DC-calculated hash value do not match, it is assumed that there is some kind of flaw in the encrypted data sent from the DP to the DC, for example, it cannot be decrypted using the provided encryption key. Therefore, in such a case, being able to cancel the transaction without providing the encryption key to the DC has an advantage for the DC in that it can avoid completing a transaction even though data cannot actually be exchanged. In addition to the point of view previously described, for example, rather than it being found that the encryption cannot be decrypted after actually performing processes such as recording the encryption key in the distributed ledger by the information processing system, acquiring the encryption key by the DC, and decrypting the encryption key, since the transaction can be canceled before these processes are performed, it is also advantageous from the viewpoint of the processing efficiency of the entire system.

In one embodiment of the present disclosure, the control unit of the information processing system may acquire a hash value of plaintext data corresponding to the encrypted data from the DP, and then when the hash value that the DC calculates from the plaintext data obtained by decrypting the encrypted data using the encryption key does not match the hash value that the DC acquires from the information processing system, the control unit may update the transaction record to a transaction canceled state or other error state.

The information processing system may confirm whether the hash value provided by the DP matches the hash value calculated by the DC, or the DC may confirm and then notify the information processing system. In notifying the information processing system from the DC, the DC may notify the information processing system regardless of whether there is a match or a mismatch, or the DC may notify the information processing system only when there is a match or only when there is a mismatch. When the information processing system confirms whether the hash values match, the confirmation may be performed by the information processing system receiving the DC-calculated hash value from the DC in the form of a plaintext authenticity confirmation request or the like, and comparing the DC-calculated hash value with the hash value provided by the DP.

In this way, when the DP-provided hash value of plaintext data and the DC-calculated hash value do not match, it is assumed that there is some kind of flaw in the encrypted data sent from the DP to the DC or the plaintext data from which the encrypted data originates. In such cases, it is advantageous to have the ability to cancel a transaction that is expected to encounter issues for the DC in that it can avoid completing a transaction despite the lack of proper data exchange.

In one embodiment of the present disclosure, the control unit of the information processing system may acquire a hash value of the encryption key from the DP, and then when the hash value calculated by the DC based on the acquired encryption key and the hash value acquired by the DC from the information processing system do not match, the control unit may update the transaction record to a transaction canceled state or other error state.

In this case, as in the case of comparing hash values of plaintext data, being able to cancel a transaction that is expected to encounter issues is advantageous for the DC in that it can avoid a transaction being completed despite the lack of proper data exchange.

In one embodiment of the present disclosure, the matching comparison of hash values of encrypted data, matching comparison of hash values of encryption keys, and matching comparison of plaintext hash values may all be executed, only some of them may be executed, or none of them may be executed at all. In the case of multiple executions, it is conceivable to execute the matching comparison of the hash values of the draft data, the matching comparison of the encryption key hash values, and the matching comparison of the hash values of the plaintext data in this order. This helps minimize wasteful processing during the cancellation of a transaction. The order of processing is not limited to this, and may be performed in any order.

In one aspect of the present disclosure, it is desirable that the information processing system provides the encryption key to the DC in such a way that the encryption key is not leaked to a third party. Even if the encryption key itself is leaked, the security of the data can be maintained as long as the corresponding encrypted data remains unknown, but it is more desirable to prevent the encryption key itself from being leaked. As a provision form that prevents an encryption key from being leaked to a third party, there are two methods: placing the encryption key in a data space (or a data space that can be read and accessed by a DC only) that cannot be read and accessed by anyone other than the DC, and encrypting the encryption key using a common key (symmetric key) or public key (asymmetric key). An example of a data space on a distributed ledger that cannot be read and accessed by anyone other than the DC is the private data collection (PDC) in Hyperledger Fabric. For example, when acquiring an encryption key from the DP, first place the encryption key in the DP's private space, and when the conditions are met, move the encryption key from the DP's PDC to the DC's private space, in such a manner that the information processing system can exchange encryption keys while protecting the secret of the encryption keys.

System Configuration

Figure 1:
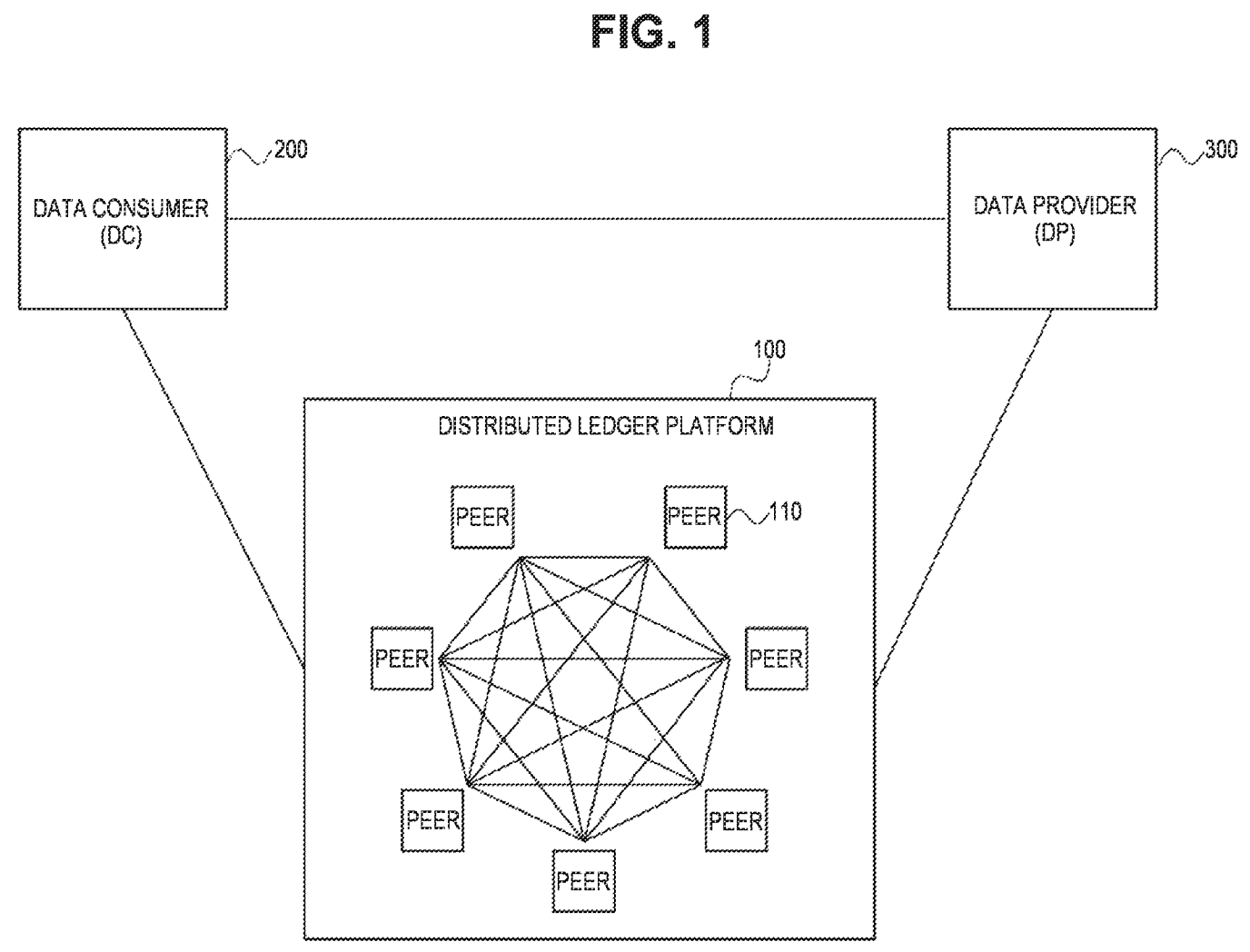

FIG. 1 is a diagram illustrating the configuration of a data exchange system according to one embodiment. The data exchange system has a configuration in which a distributed ledger platform 100, a data consumer (DC) 200, and a data provider (DP) 300 are connected to each other so as to be able to communicate with each other.

The DC 200 is a computer managed by an entity that uses data provided from the DP 300, for example, to provide services to end users.

The DP 300 is a computer managed by an entity that provides the data it holds to the DC 200.

The distributed ledger platform 100 is configured by a plurality of peer nodes 110 and provides distributed ledger technology. In addition to transaction records, the distributed ledger platform 100 also records an encryption key for decrypting encrypted data exchanged between the DC 200 and the DP 300 and various hash values for confirming the authenticity of the data. In this embodiment, the encrypted data itself exchanged between the DC 200 and the DP 300 is exchanged between the DC 200 and the DP 300 without using the distributed ledger platform 100.

The distributed ledger platform 100 in the present embodiment is a consortium type in which the management entities of the DC 200 and DP 300 participate as administrators, and the peer node 110 is an information processing device managed by the administration entity of the DC 200 or DP 300. A consortium-type distributed ledger platform is constructed using, for example, the Hyperledger Fabric framework. A server-side program based on Hyperledger Fabric is installed on the peer node 110 to construct a distributed ledger platform. Additionally, a smart contract function (chaincode) is deployed on the peer node 110.

Further, the distributed ledger platform 100 includes a data space that participants can freely access and a data space that has limited access privileges. In the present embodiment, a data space that is readable and writable only by the DP 300 and a data space that is writable by the DP 300 and readable by the DC 200 are used.

In another embodiment, the distributed ledger platform 100 may take the form of a private type, involving a single administrator and a limited number of participants, or a public type, with no administrator, allowing participation from anyone.

In the present embodiment, the DC 200 and the peer node 110, or the DP 300 and the peer node 110 may be the same device. That is, one information processing device may include both functions, described below, from the DC 200 or DP 300 and from the peer node 110.

The peer node 110, the DC 200, and the DP 300 are all configured by one or more information processing devices (computers). As illustrated in FIG. 2, an information processing device 20 includes a processor 21, a main storage device 22, an auxiliary storage device 23, an input/output device 24, and a communication device 25. In the information processing device 20, the processor 21 executes a program loaded into the main storage device 22, thereby realizing the functions described below.

In the present embodiment, the distributed ledger platform 100 corresponds to an information processing system that mediates data transactions between the DC 200 and the DP 300. Furthermore, the processor 21 of the peer node 110 corresponds to the control unit in the present disclosure.

Overview of Processing

Figure 3:
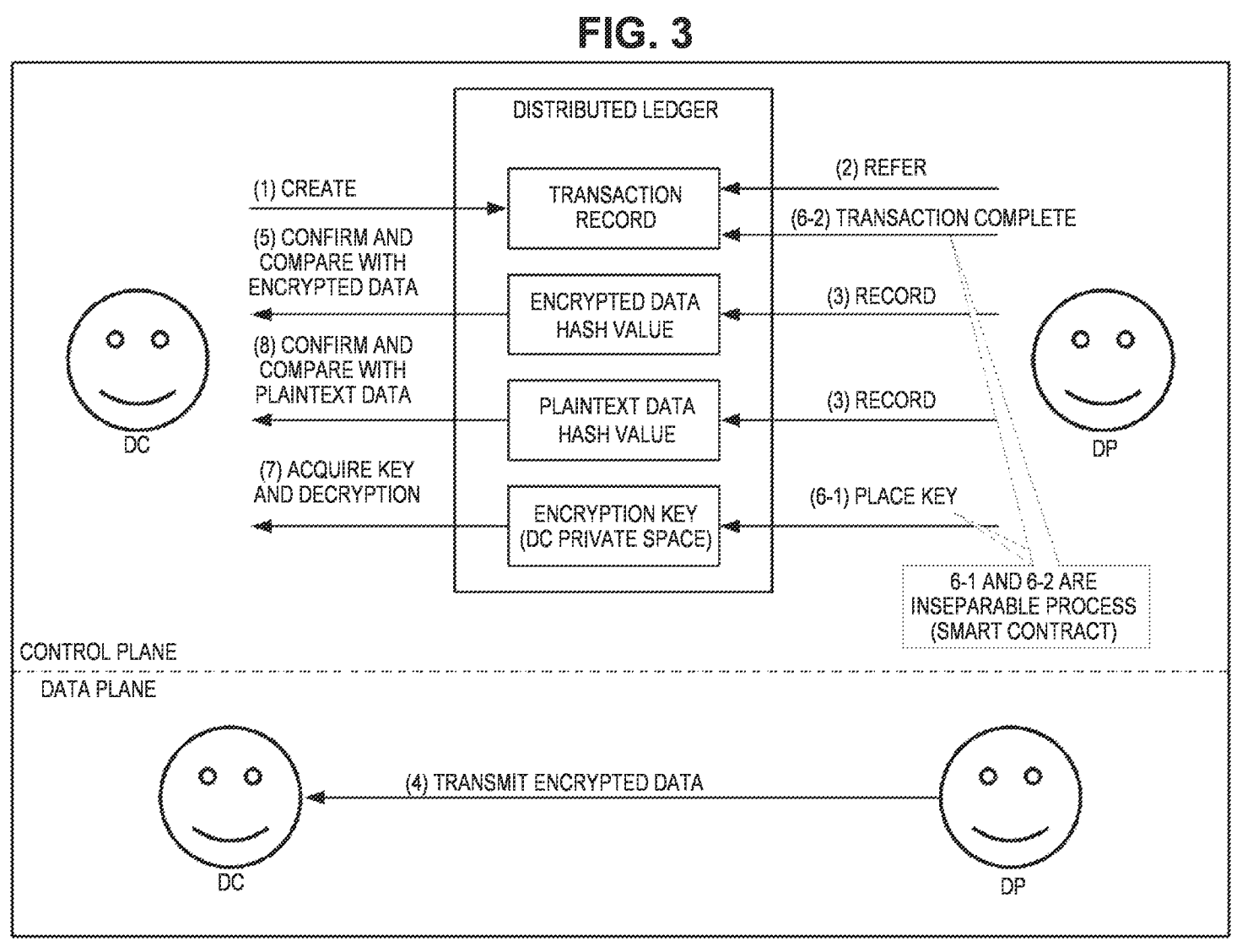

FIG. 3 is a diagram illustrating an overview of the data transaction method in the present embodiment. As illustrated in FIG. 3, the present embodiment is separated into a data plane in which the data itself provided from the DP 300 to the DC 200 is transmitted and a control plane in which data related to transaction mediation is exchanged. The criteria for separating the data plane and the control plane may be logical, physical or substantially different. In the present embodiment, the control plane passes through the distributed ledger platform 100, and the data plane does not pass through the distributed ledger platform 100.

The data transaction process will be roughly described based on FIG. 3. FIG. 3 is for illustrating the outline, and details of the processing will be described below with reference to FIGS. 4A to 4C.

First, the DC 200 creates a transaction record in the distributed ledger platform 100 to record the details and state of the transaction or to make the details and state of the transaction referable (1). The DP 300 refers to the created transaction record (2) and prepares the data (plaintext data) requested by the DC 200. The DP 300 encrypts the plaintext data to be transmitted to the DC 200, records the hash values of the plaintext data and the encrypted data on the distributed ledger platform 100 (3), and also transmits the encrypted data to the DC 200 via the data plane (4). The DC 200 calculates the hash value of the encrypted data received from the DP 300, determines whether it matches the encrypted data hash value calculated by the DP 300, and confirms whether there is any inconsistency in the encrypted data sent from the DP 300 (5). In the present embodiment, the distributed ledger platform 100 performs the hash value matching confirmation itself. On the condition that the encrypted text data hash values match, the recording of the encryption key provided by the DP 300 in the distributed ledger (6-1) and the updating of the transaction record to the completed state (6-2) are performed inseparably. Here, the encryption key is placed in a private space on the distributed ledger that can be read and accessed only by the DC 200 and write-accessed only by the DP 300. The DC 200 obtains the encryption key and decrypts the encrypted data to obtain plaintext data (7). In addition, the DC 200 determines whether the hash value of the plaintext data obtained by decrypting the encrypted data received from the DP 300 matches the plaintext data hash value calculated by the DP 300, and confirms whether there is any inconsistency in the data sent from the DP 300 (8). This hash value matching confirmation may be performed by the distributed ledger platform 100 or by the DC 200.

The inseparable execution of the encryption key placement and transaction complete recording (6-1 and 6-2) can be performed using a smart contract function. The smart contract function can prevent discrepancies between data exchange and transaction records through simple processing.

In addition, it is possible that the encrypted data cannot be decrypted using the encryption key sent from the DP 300, but by sharing the hash value of the encrypted data, the DC 200 can determine that it cannot be decrypted and cancel the transaction before acquiring or requesting the encryption key. Furthermore, although it is possible that the decrypted data has no value, the DC 200 can assert that the data has no values along with the plaintext data and request to cancel the transaction.

FIGS. 4A to 4C are sequence diagrams illustrating details of the data transaction method in the present embodiment. The correspondence between the processing in FIGS. 4A to 4C and the processing in FIG. 3 is as follows. Steps S11 to S14 correspond to processing (1) in FIG. 3. Steps S16 to S17 correspond to processing (2). Parts of steps S20 and S21 and S22 correspond to processing (3). Step S25 corresponds to processing (4). Steps S26 to S28 correspond to processing (5). Step S29 corresponds to processing (6-1), and step S30 corresponds to processing (6-2). Steps S31 to S33 and S37 correspond to processing (7). Steps S38 to S40 correspond to processing (8). In FIG. 3, some of the processes shown in FIGS. 4A to 4C are omitted.

In the following description, the peer node 110 and the distributed ledger platform 100 will not be particularly distinguished, and data exchange between the DC 200 or DP 300 and the peer node 110 may be expressed as data exchange between the DC 200 or DP 300 and the distributed ledger platform 100. Furthermore, when the peer node 110 performs some kind of processing related to the distributed ledger platform 100, it may be expressed that the distributed ledger platform 100 performs this processing.

In step S11, the DC 200 requests one of the peer nodes forming the distributed ledger platform 100 to create a transaction record by giving a user ID (UID). The user ID (UID) may be any identifier that can identify the DC 200. Further, the destination of the transaction record creation request may be any peer node 110 that forms the distributed ledger platform 100. Since the transaction record also represents a data request from the DC 200 to the DP 300, it may be called a "data request ticket" or simply a "ticket".

In step S12, the distributed ledger platform 100 creates a transaction record on the distributed ledger. In this case, the state (transaction state) of the transaction record is set to "unreferenced" state. The "unreferenced" state is a state in which the created transaction record is not referenced by the DP 300.

In step S13, the distributed ledger platform 100 transmits a transaction record creation completion notification to the DC 200. The transaction creation completion notification includes the transaction ID. The transaction ID is an identifier that identifies a transaction, and is also an identifier that identifies a transaction record.

In step S15, the DC 200 transmits a data request to the DP 300. The data request includes a transaction ID. Further, the data request may include specification of data required by the DC 200.

In step S16, the DP 300 transmits a transaction record reference request to the distributed ledger platform 100 (peer node 110). The transaction record reference request includes the transaction ID.

In step S17, the distributed ledger platform 100 acquires the transaction record corresponding to the received transaction ID from the distributed ledger and transmits it to the DP 300.

In step S18, the DP 300 prepares the data (plaintext data) requested by the DC 200.

In step S19, the DP 300 encrypts the data prepared in step S18 using a predetermined encryption key. In the following, data (plaintext) provided from the DP 300 to the DC 200 and data obtained by encrypting this plaintext data will be respectively simply referred to as "plaintext data" and "encrypted data", when it is clear from the context.

In step S20, the DP 300 calculates hash values of the plaintext data and the encrypted data, respectively. The hash values of plaintext data and encrypted data are hereinafter referred to as plaintext data hash values and encrypted data hash values.

In step S21, the DP 300 transmits a data preparation completion notification to the distributed ledger platform 100. The data preparation completion notification includes a plaintext data hash value, an encrypted data hash value, and an encryption key. In this embodiment, the encryption key is stored in a private space (for example, a private data collection (PDC) in Hyperledger Fabric) that can be accessed only by authorized persons. The encryption key is first stored in a private space that can be read and accessed only by the DP 300. Since the peer nodes 110 that can access the private space are limited, the DP 300 transmits the data preparation completion notification to the peer nodes 110 (typically, a peer node managed by the DP 300) that can access the private space of the DP 300 in step S21.

In step S22, the distributed ledger platform 100 records the plaintext data hash value and the encrypted data hash value received from the DP 300 in the distributed ledger.

In step S23, the distributed ledger platform 100 stores the encryption key received from the DP 300 in a private space (also referred to as a DP-only space) that can be read and accessed only by the DP 300.

In step S24, the distributed ledger platform 100 transitions the state of the transaction record to the "encryption key preparation completed" state. The encrypted data transmission to the DC 200 (S25) may be performed before the process of step S24.

Here, the processes of steps S22 to S24 in the distributed ledger platform 100 are executed inseparably. Executing these three processes inseparably means that when any one of the three processes is executed, the other two are also executed, in other words, it represents a control by which either all three processes are executed or none of the three processes are executed. Processes and operations that are executed indivisibly are also referred to as "transaction processes", "inseparable operations", "atomic operations", and the like. In the sequence diagrams of FIGS. 4A to 4C, multiple processes that are executed inseparably are surrounded by a rectangle labeled "Seq Critical".

In the present embodiment, the processes of steps S22 to S24 are executed through the use of a smart contract program employing distributed ledger technology. A smart contract is a program or code that defines the logic of a transaction. The peer node 110 that receives the data preparation completion notification from the DP 300 calls and executes this smart contract. This ensures that steps S22 to S24 are executed inseparably.

In step S25, the DP 300 transmits encrypted data to the DC 200. As described above, the encrypted data is transmitted via a communication path different from that of the distributed ledger.

In step S26, the DC 200 calculates a hash value of the encrypted data received from the data provider 300.

In step S27, the DC 200 transmits an encryption key transfer request to the peer node 110 (typically, a peer node managed by the DP 300) that can acquire the encryption key from the private space of the DP 300. The encryption key transfer request includes the transaction ID and the hash value of the encryption data calculated by the data consumer.

In step S28, the distributed ledger platform 100 confirms whether the encrypted data hash value received from the DC 200 matches the encrypted data hash value (the encrypted data hash value calculated by the DP 300) recorded on the distributed ledger. When there is a mismatch, error processing is performed. Here, the description will proceed assuming that both match.

In step S29, the distributed ledger platform 100 moves the encryption key, which is recorded in the DP-only space that can be read and written only by the DP 300, to a private space (hereinafter also referred to as DC-only space) that is writeable only by the DP 300 and readable by the DC 200. Here, it is assumed that the encryption key is deleted from the DP-only space, but it is sufficient if the encryption key is stored at least in the DC-only space.

In step S30, the distributed ledger platform 100 transitions the state of the transaction record to the "transaction completed (cancellable)" state.

The processes of steps S28 to S30 are inseparably executed using the smart contract function.

In step S31, in response to the completion of the encryption key transfer request, the DC 200 transmits an encryption key acquisition request to the peer node 110 (typically, a peer node that manages the DC 200) that can acquire the encryption key from the private space of the DC 200. The encryption key acquisition request includes a transaction ID.

In step S32, the distributed ledger platform 100 acquires the encryption key from the private space of the DC, and transmits the encryption key to the DC 200 in step S33.

In step S34, the DC 200 calculates a hash value of the acquired encryption key. In step S35, the DC 200 transmits an encryption key authenticity confirmation request to the distributed ledger platform 100. The encryption key authenticity confirmation request includes the transaction ID and the hash value of the encryption key calculated by the DC 200.

In step S36, the distributed ledger platform 100 confirms whether the hash value of the encryption key calculated by the DC 200 matches the hash value (the hash value of the encryption key calculated by the DP 300) of the encryption key recorded in the distributed ledger. When there is a mismatch, error processing is performed. Here, the description will proceed assuming that both match.

In step S37, in response to confirmation of the authenticity of the encryption key, the DC 200 decrypts the encrypted data using the encryption key to obtain plaintext data.

In step S38, the DC 200 calculates a hash value of the plaintext data. In step S39, the DC 200 transmits a plaintext authenticity confirmation request to the distributed ledger platform 100. The plaintext authenticity confirmation request includes the transaction ID and the hash value of the plaintext data calculated by the DC 200.

In step S40, the distributed ledger platform 100 confirms whether the hash value of the plaintext data calculated by the DC 200 matches the hash value (the hash value of the plaintext data calculated by the DP 300) of the plaintext data recorded in the distributed ledger. When there is a mismatch, error processing is performed. Here, the description will proceed assuming that both match. The hash value of the plaintext data calculated by the DP 300 may be stored in an area accessible by the DC 200, and the DC 200 may confirm the matching of the hash values.

In step S41, the DC 200 evaluates the plaintext data in response to the confirmation of the authenticity of the plaintext data. The plaintext data may be evaluated based on, for example, whether the data (plaintext data) provided from the DP 300 matches the request of the DC 200. When the DC 200 determines that the plaintext data is inappropriate, it notifies the distributed ledger platform 100 of this fact. On the other hand, when it is determined that plaintext data is appropriate, the distributed ledger platform 100 may be notified of this, or the process may proceed without notification.

In step S42, the DC 200 uses the data provided from the DP 300 to provide a service to the end user. The services provided are not particularly limited. In addition, instead of providing services to end users, the DC 200 may use the data for itself.

Transaction State Management

Figure 5:
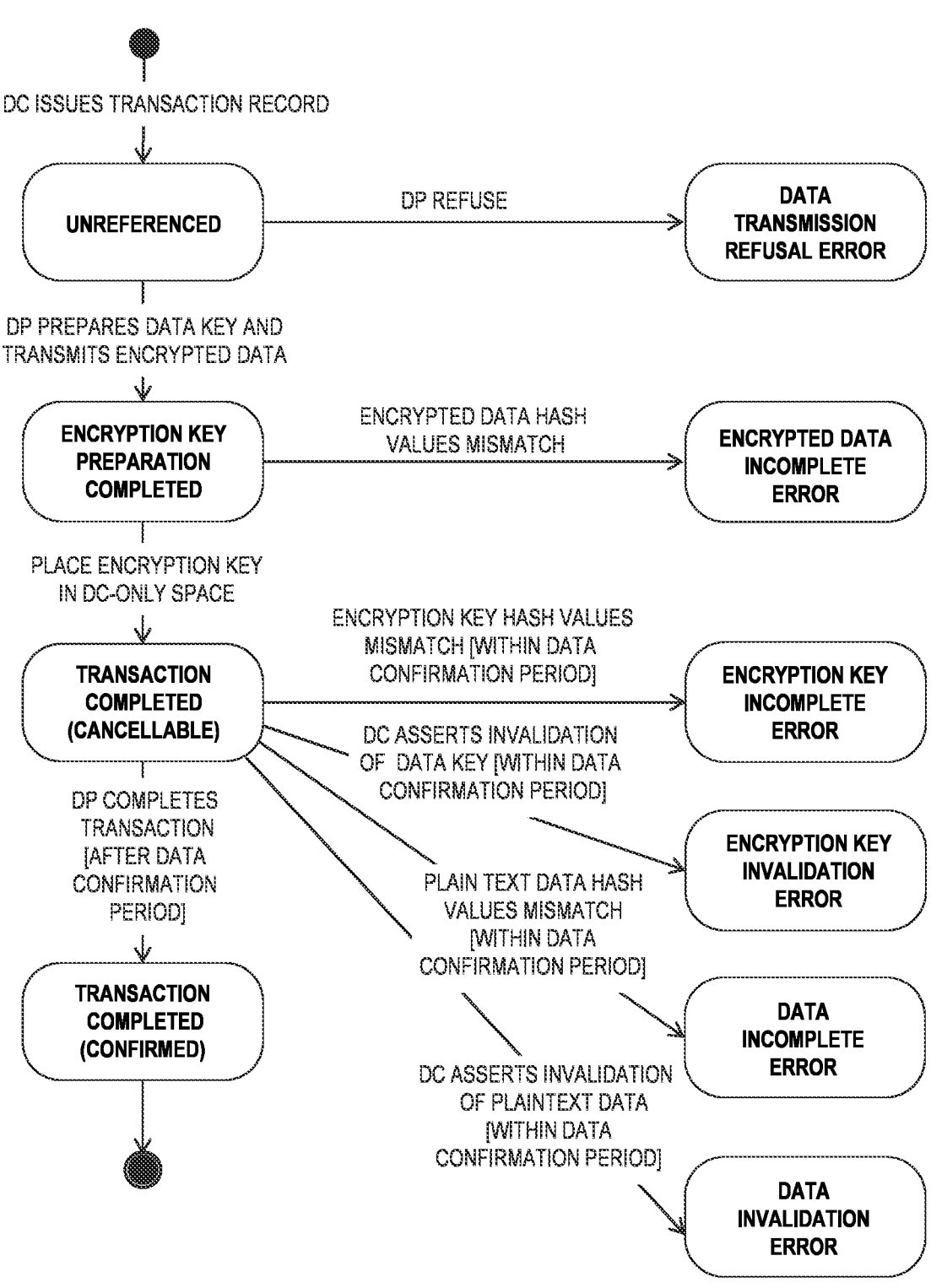
FIG. 5 is a state transition diagram of a data request ticket in the embodiment.

FIG. 5 is a diagram illustrating the state transition of a transaction in this embodiment.

First, when a transaction record is created (S12) in response to a transaction record creation request (S11) from the DC 200, the transaction state transitions to the "unreferenced" state. The unreferenced state is a state in which the transaction record is not referenced by the DP 300 after the transaction record has been created.

When the DP 300 refers to the transaction record (S16 to S17) and records the encryption key, plaintext data hash value, and encrypted data hash value in the distributed ledger (S18 to S23), the transaction state transitions to the "encryption key preparation completed" state. The encrypted data is in a state in which recording of the encryption key in the distributed ledger and transmission of the encrypted data to the DC 200 have been completed.

In the "unreferenced" state, after the DP 300 references the transaction record (S16 to S17), the DP 300 may reject the transaction. In this case, the DP 300 notifies the distributed ledger platform 100 that the transaction is rejected, and the transaction state transitions to a "data transmission refusal error" state. Further, when a data preparation completion notification is not transmitted from the DP 300 even after a predetermined period has elapsed since the transaction record was created, the transaction state transitions to a "data transmission refusal error" state or a separately defined error state.

In the "encryption key preparation completed" state, the DC 200 requests the transfer of the encryption key along with the encrypted data hash value that it has calculated itself (S27), and when the match of the encrypted data hash values is confirmed and the encryption key is placed in the DC-only space (S28 to S29), the transaction state transitions to the "transaction completed (cancellable)" state. On the other hand, when the encrypted data hash value calculated by the DC 200 and the encrypted data hash value calculated by the DP 300 do not match, the transaction state transitions to an "encrypted data incomplete error" state. When the encrypted data hash values do not match, it is assumed that there is some kind of flaw in the encrypted data.

The "transaction completed (cancellable)" state is a state in which the data transaction has been completed, but the DC 200 can request cancellation of the transaction within a certain period (time available for requesting cancellation). This state may be referred to as a "transaction provisionally completed" state.

In the "transaction completed (cancellable)" state, when it is determined that the encryption key hash value calculated by the DC 200 and the encryption key hash value calculated by the DP 300 do not match within the time available for requesting cancellation after the state transition (S36), the transaction state transitions to the "encryption key incomplete error" state. In this state, the hash values of the encryption keys do not match, and thus there is some kind of flaw in the encryption keys.

In the "transaction completed (cancellable)" state, when the DC 200 asserts the invalidity of the encryption key within the time available for requesting cancellation after the state transition, the transaction state transitions to the "encryption key invalidation error" state. The DC 200 asserts the invalidity of the encryption key, for example, when the DC 200 cannot decrypt encrypted data using the encryption key.

In the "transaction completed (cancellable)" state, when it is determined that the plaintext data hash value calculated by the DC 200 and the plaintext data hash value calculated by the DP 300 do not match within the time available for requesting cancellation after the state transition (S40), the transaction state transitions to the "data incomplete error" state. In this state, the hash values of the plaintext data do not match, thus there is some kind of flaw in the plaintext data.

In the "transaction completed (cancellable)" state, when the DC 200 asserts the invalidity of the plaintext data within the time available for requesting cancellation after the state transition, the transaction state transitions to the "data invalid error" state. The DC 200 asserts the invalidity of the plaintext data when the DC 200 determines that the plaintext data has no value, for example, because the plaintext data does not match the request of the DC 200.

In the "transaction completed (cancellable)" state, when the DC 200 notifies the acceptance of the plaintext data, that is, the transaction complete, after the time available for requesting cancellation has elapsed, the transaction state transitions to the "transaction completed (confirmed)" state. After this, the transaction state cannot be changed and the transaction is completed. Even within the time available for requesting cancellation, if the DC 200 notifies the transaction complete, the transaction state may transition to "transaction completed (confirmed)".

Billing processing, that is, payment of charges from the DC 200 to the DP 300, or mediation thereof by a third party, is performed based on the transaction record in the "transaction completed (confirmed)" state. On the other hand, all error states can be considered as transaction canceled states. Therefore, transactions that result in some kind of error need not be subject to billing processing. For transactions that result in an error state, a third party other than the DC 200 and DP 300 may determine whether the cause of the error is in the DC 200 or the DP 300 and perform reliability evaluation of the DC 200 and the DP 300, billing processing or the like that takes the cause of the error into consideration.

Advantageous Effects of this Embodiment

Since the smart contract function is used to inseparably exchange data and change the transaction state, there is no discrepancy between them. In addition, since it uses the smart contract function, mediation costs are low and mediation processing can be performed with high transparency.

Data exchange via the distributed ledger platform is limited to cryptographic keys and hash values, and encrypted data is exchanged without going through the distributed ledger, so there are no issues during the exchange of large-sized data.

Since hash values of encrypted data are exchanged, it is possible to detect that the data or encryption key provided from the DP 300 to the DC 200 is inappropriate, and there is also the advantage that the transaction can be cancelled. Further, in the case where inappropriate data is provided or the decrypted data has no value, by recording the hash value, it becomes possible to track that the DP 300 provided inappropriate data.

Furthermore, since the encryption key is exchanged via the private spaces of the DC 200 and DP 300, it is possible to prevent the encryption key from being leaked to a third party.

Modification Example

In the description, the transition to the "transaction completed (cancellable)" state is performed at the time (S30) the encryption key is recorded in the private space of the DC 200, but this may be done at the time (S32 to S33) the encryption key is transmitted to the DC 200. Since it is essential to use the smart contract function when acquiring data from the private space, it is possible to inseparably execute the acquisition of the encryption key from the DC-only space, provision to the DC 200, and transaction state transition.

Further, although the encryption key is exchanged via the private space, the encryption key may be encrypted, recorded in a distributed ledger, and then, passed from the DP 300 to the DC 200. Encryption may be performed using a common key (symmetric key) or may be performed using the public key (asymmetric key) of the DC 200. When the encryption key is not stored in a private space, data can be acquired without using the smart contract function. Therefore, it is preferable to record the transaction complete on the condition that the encryption key is recorded in the distributed ledger, rather than to record the transaction complete on the condition that the encryption key is acquired.

Furthermore, the exchange of encryption keys and transaction records may be performed without necessarily using a distributed ledger platform. Any system other than the distributed ledger platform can be used as long as it can inseparably provide encryption keys and record transaction complete.

OTHER EMBODIMENTS

The embodiment is merely an example, and the present disclosure may be implemented with appropriate changes within the scope of the gist thereof.

The present disclosure can also be realized by supplying a computer program implementing the functions described in the embodiments to a computer, and having one or more processors included in the computer read and execute the program. Such a computer program may be provided to the computer by a non-transitory computer-readable storage medium connectable to a system bus of the computer, or may be provided to the computer via a network. The non-transitory computer-readable storage medium includes, for example, any type of disk, such as a magnetic disk (floppy (registered trademark) hard drive disk (HDD), and the like), and an optical disks (CD-ROM, DVD disk, Blu-ray disk, and the like), a read-only memory (ROM), a random access memory (RAM), an EPROM, an EEPROM, a magnetic card, a flash memory, an optical card, or any type of medium suitable for storing an electronic instruction.

What is claimed is:

1. An information processing system that mediates a data transaction between a data provider and a data consumer, the information processing system comprising:
    a control unit configured to:
    inseparably execute making an encryption key for encrypted data obtained by encrypting data exchanged between the data provider and the data consumer available to the data consumer, or causing the data consumer to actually obtain the encryption key;
    record a transaction record between the data provider and the data consumer as transaction complete;
    acquire a hash value of plaintext data corresponding to the encrypted data from the data provider; and
    update a state of the data transaction to transaction cancelled when a hash value, calculated from plaintext data obtained by the data consumer through decrypting the encrypted data using the encryption key, does not match the hash value of the plaintext data acquired from the data provider.

2. The information processing system according to claim 1, wherein the control unit is configured to provide the encryption key from the data provider to the data consumer via a distributed ledger platform.

3. The information processing system according to claim 2, wherein the control unit is configured to place the encryption key in a data space that is not able to be read and accessed by anyone other than the data consumer of the distributed ledger platform.

4. The information processing system according to claim 2, wherein the control unit is configured to encrypt the encryption key using a common key shared by the data provider and the data consumer, and to record the encryption key in the distributed ledger platform.

5. The information processing system according to claim 2, wherein the control unit is configured to encrypt the encryption key using a public key of the data consumer and record the encryption key in the distributed ledger platform.

6. The information processing system according to claim 1, wherein the control unit is configured to record the transaction record on a distributed ledger platform.

7. The information processing system according to claim 1, wherein the control unit is configured to use a smart contract function of a distributed ledger platform to inseparably execute making the encryption key available to the data consumer, or causing the data consumer to actually obtain the encryption key, and recording the transaction record as transaction complete.

8. The information processing system according to claim 7, wherein the control unit is configured to,
    use the smart contract function to inseparably record the encryption key in a data space of the distributed ledger platform that is able to be read and accessed only by the data consumer, and record the transaction complete in response to receiving the encryption key from the data provider.

9. The information processing system according to claim 7, wherein the control unit is configured to:
    record the encryption key in a data space of the distributed ledger platform that is able to be read and accessed only by the data consumer; and
    inseparably transmit the encryption key to the data consumer and record the transaction complete using the smart contract function in response to receiving a request for acquiring the encryption key from the data consumer.

10. The information processing system according to claim 1, wherein the control unit is configured to:
    acquire a hash value of the encrypted data from the data provider; and
    provide the encryption key to the data consumer when a hash value of the encrypted data calculated by the data consumer and the hash value acquired from the data provider match.

11. An information processing system that mediates a data transaction between a data provider and a data consumer, the information processing system comprising:
    a control unit configured to:
    inseparably execute making an encryption key for encrypted data obtained by encrypting data exchanged between the data provider and the data consumer available to the data consumer, or causing the data consumer to actually obtain the encryption key; and
    record a transaction record between the data provider and the data consumer as transaction complete,
        wherein for a predetermined period after the data consumer becomes able to acquire the encryption key or after the data consumer actually acquires the encryption key, the control unit is configured to receive a transaction cancellation request from the data consumer and update a state of the data transaction to transaction cancelled, and then the control unit is configured not to update the state of the data transaction after the predetermined period has elapsed.

12. A non-transitory storage medium storing a first instruction that is executable by one or more processors and that causes the one or more processors to perform functions comprising:
    controlling a distributed ledger platform so as to inseparably execute making an encryption key for encrypted data obtained by encrypting data exchanged between a data provider and a data consumer available to the data consumer via the distributed ledger platform, or causing the data consumer to actually obtain the encryption key from the distributed ledger platform, and recording a transaction record between the data provider and the data consumer as transaction complete in the distributed ledger platform; and
    storing a second instruction that is executable by the one or more processors and that causes the one or more processors to perform functions comprising:

receiving a transaction cancellation request from the data consumer and updating a state of data transaction between the data provider and the data consumer to a transaction cancelled state for a predetermined period after the data consumer becomes able to acquire the encryption key or after the data consumer actually acquires the encryption key, and not updating the transaction record after the predetermined period has elapsed.

13. The non-transitory storage medium according to claim 12, wherein making the encryption key available to the data consumer via the distributed ledger platform means recording the encryption key in a data space of the distributed ledger platform that is able to be read and accessed by the data consumer.

14. The non-transitory storage medium according to claim 12, wherein causing the data consumer to actually obtain the encryption key from the distributed ledger platform means that the distributed ledger platform transmits the encryption key to the data consumer in response to a request to acquire the encryption key from the data consumer.

15. The non-transitory storage medium according to claim 12, wherein the functions include causing the distributed ledger platform to perform, recording the encryption key in a data space of the distributed ledger platform that is able to be read and accessed only by the data provider in response to receiving the encryption key from the data provider, and recording the encryption key in a data space of the distributed ledger platform that is able to be read and accessed only by the data consumer in response to receiving an encryption key acquisition request from the data consumer.

16. The non-transitory storage medium according to claim 15, wherein the functions further include causing the distributed ledger platform to perform, receiving from the data provider a hash value of the encrypted data calculated by the data provider, and receiving from the data consumer a hash value of the encrypted data calculated by the data consumer, and recording the encryption key in the data space of the distributed ledger platform that is able to be accessed only by the data consumer is executed when the hash value of the encrypted data calculated by the data provider matches the hash value of the encrypted data calculated by the data consumer after receiving an encryption key acquisition request from the data consumer.

* * * * *